US006928933B2

(12) United States Patent
Grau

(10) Patent No.: US 6,928,933 B2
(45) Date of Patent: Aug. 16, 2005

(54) PRINTING PRESS RACKING BOARD AND CORNER ANGLE SUPPORT

(76) Inventor: William G. Grau, 18651 Cerro Villa Dr., Villa Park, CA (US) 92861

( * ) Notice: Subject to any disclaimer, the term of this patent is extended or adjusted under 35 U.S.C. 154(b) by 252 days.

(21) Appl. No.: 10/194,173

(22) Filed: Jul. 12, 2002

(65) Prior Publication Data

US 2003/0053859 A1 Mar. 20, 2003

Related U.S. Application Data

(60) Provisional application No. 60/305,127, filed on Jul. 13, 2001.

(51) Int. Cl.[7] .............................................. B65D 19/38
(52) U.S. Cl. ................................ 108/57.25; 248/346.01
(58) Field of Search .......................... 108/51.11, 51.3, 108/57.25, 53.1, 53.3, 91, 92, 901; 248/220.1, 220.22, 346.01; 206/386, 600, 597

(56) References Cited

U.S. PATENT DOCUMENTS

| | | | | |
|---|---|---|---|---|
| 1,514,512 A | * | 11/1924 | Fisher | 206/821 |
| 2,895,608 A | * | 7/1959 | Wilson | 206/597 |
| 3,481,502 A | * | 12/1969 | Slayman | 206/511 |
| 3,699,900 A | * | 10/1972 | Carlson | 108/53.1 |
| 3,926,321 A | * | 12/1975 | Trebilcock | 108/53.1 |
| 4,043,721 A | | 8/1977 | Lemelson | |
| 4,065,014 A | * | 12/1977 | Sagmiller | 414/608 |
| 4,226,192 A | * | 10/1980 | Myers | 108/53.1 |
| 4,293,605 A | * | 10/1981 | Persson et al. | 108/51.3 |
| 4,317,517 A | * | 3/1982 | Tisdale | 206/597 |
| 4,435,463 A | * | 3/1984 | Roellchen | 206/386 |
| 4,579,320 A | * | 4/1986 | Gladish | 108/51.11 |
| 4,949,929 A | * | 8/1990 | Kesselman et al. | 248/220.1 |
| 5,127,619 A | * | 7/1992 | Bleim | 248/346.01 |
| 5,413,052 A | * | 5/1995 | Breezer et al. | 108/56.1 |
| 5,489,410 A | | 2/1996 | Baumgartner et al. | |
| 5,525,030 A | * | 6/1996 | Buchman | 108/901 |
| 5,606,921 A | | 3/1997 | Elder et al. | |
| 5,664,934 A | * | 9/1997 | Schaede et al. | 108/53.1 |
| 5,722,626 A | * | 3/1998 | Menchetti et al. | 248/346.01 |
| 5,868,080 A | * | 2/1999 | Wyler et al. | 108/57.25 |
| 5,938,365 A | | 8/1999 | Grewe et al. | |
| D423,752 S | | 4/2000 | Elder | |
| 6,089,778 A | | 7/2000 | Hirano et al. | |
| D433,208 S | | 10/2000 | Elder | |
| 6,125,770 A | * | 10/2000 | Brandenburg | 108/57.25 |
| 6,186,078 B1 | * | 2/2001 | Brown | 108/57.25 |
| 6,199,488 B1 | * | 3/2001 | Favaron et al. | 108/57.25 |
| 6,209,464 B1 | | 4/2001 | Elder | |
| 6,553,207 B2 | | 4/2003 | Tsusaka et al. | |
| 6,626,634 B2 | * | 9/2003 | Hwang et al. | 108/51.11 |
| 2001/0009625 A1 | | 7/2001 | Tamehira | |
| 2002/0093272 A1 | | 7/2002 | Saravis | |
| 2003/0053859 A1 | | 3/2003 | Grau | |

FOREIGN PATENT DOCUMENTS

JP          6-48446a        *  2/1994

* cited by examiner

*Primary Examiner*—Jose V. Chen
(74) *Attorney, Agent, or Firm*—Stetina Brunda Garred & Brucker

(57) ABSTRACT

A printing press racking board and corner angle support, both preferably formed via injection molding processes. The racking board is a generally flat member having stiffening ribs and stiffening rod inserts attached to the bottom surface so that the board can exhibit the required stiffness. Hand holds and finger holes are included to facilitate moving the racking board. The corner angle support has two members extending perpendicularly from each other. Each member has flanges which can support a racking board, and each member also includes stiffening ribs to increase stiffness. The racking board and supports are both lighter than the prior art, and yet both exhibit the required stiffness. Also, racking board and supports are less likely to splinter and fracture, and thus exhibit a longer user life.

20 Claims, 7 Drawing Sheets

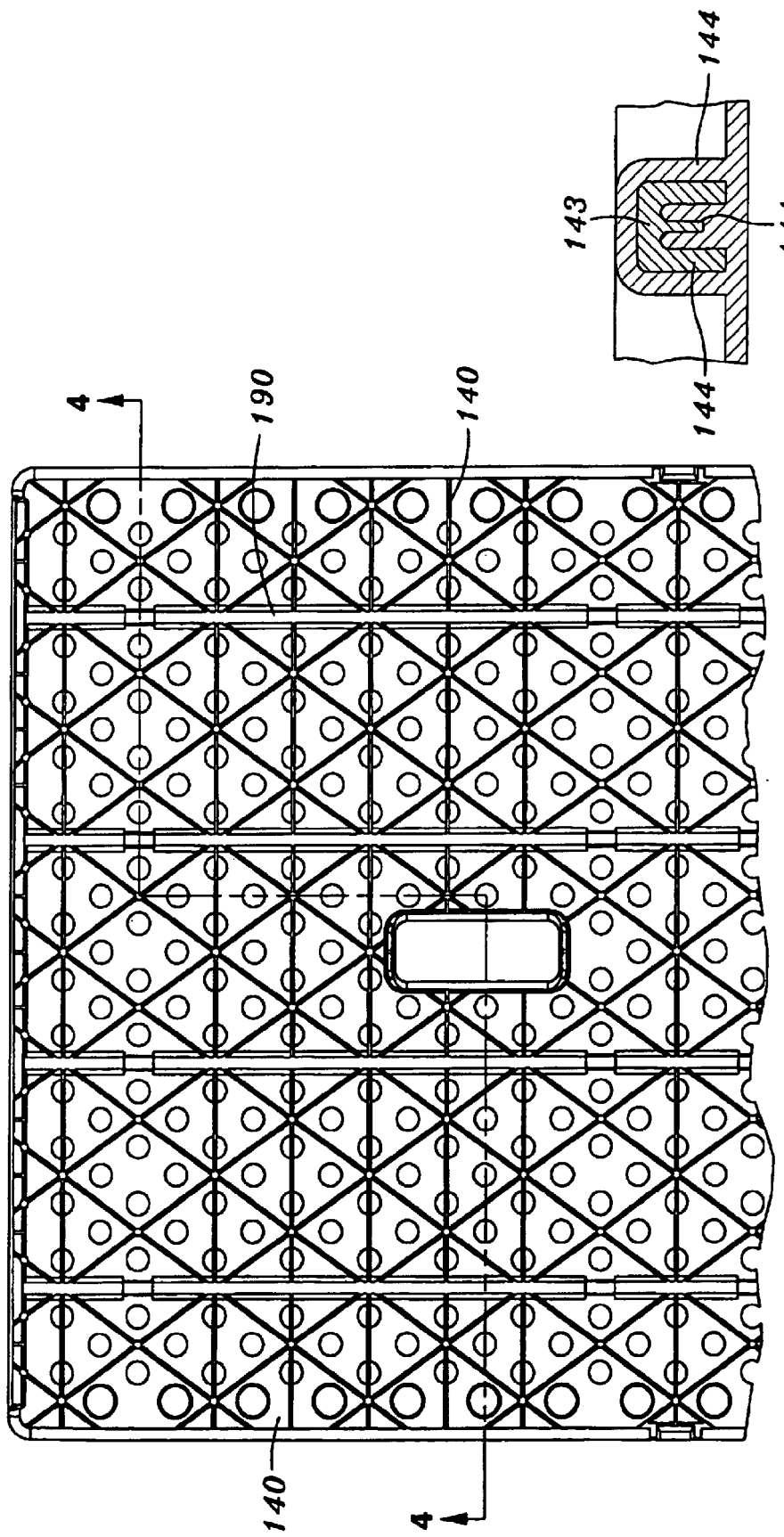

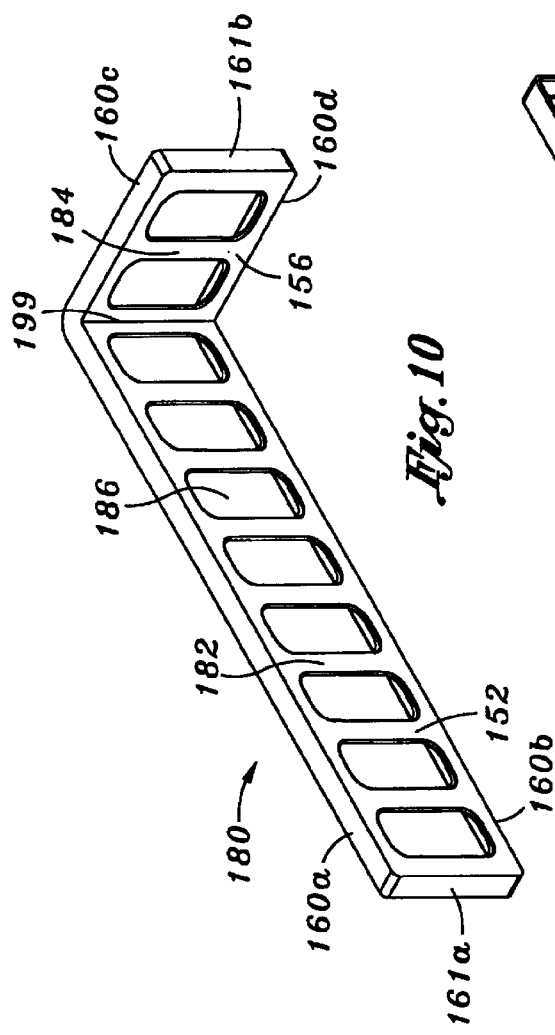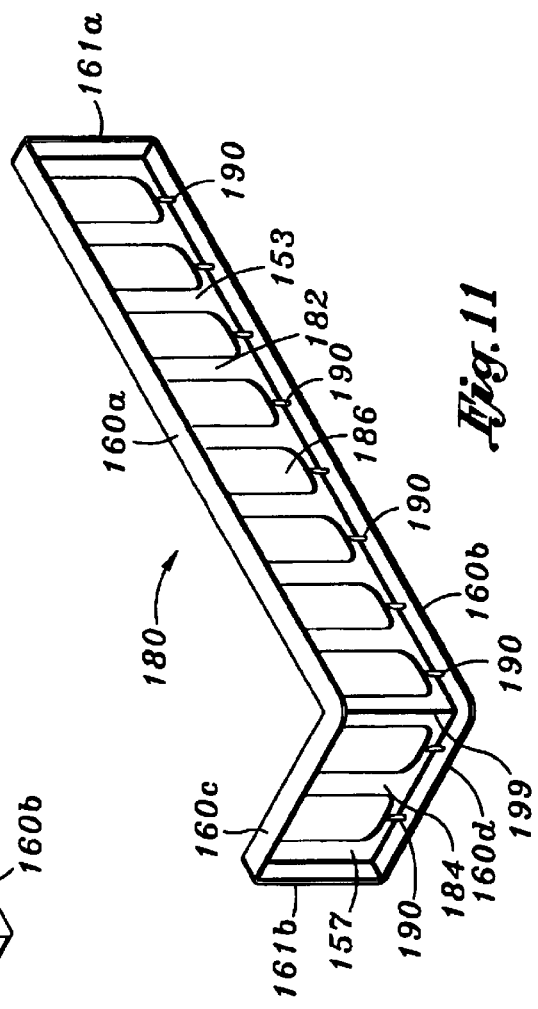

US 6,928,933 B2

PRINTING PRESS RACKING BOARD AND CORNER ANGLE SUPPORT

CROSS-REFERENCE TO RELATED APPLICATIONS

This application claims the benefit of U.S. Provisional Application No. 60/305,127, filed Jul. 13, 2001.

STATEMENT RE: FEDERALLY SPONSORED RESEARCH/DEVELOPMENT (Not Applicable)

BACKGROUND OF THE INVENTION

The present invention generally relates to printing press racking boards and corner angle supports, and more specifically to injection molded, reinforced racking boards and injection molded corner angle supports that are both lighter and exhibit a longer useful life as compared to the prior art.

Those involved in the printing industry often complete high-volume sheet printing with a sheet-fed printing press. During this largely automated process, blank paper sheets individually move along a conveyer belt into the press and inks are stamped onto the sheets. Then, the sheets feed out of the press, reach the end of the conveyer belt, and fall upon a racking board set atop a pallet. Many printed sheets stack up on the racking board as they fall thereupon, and the racking board moves downward relative to the end of the conveyer belt as the sheets stack up.

Because the weight of the sheets and the undried ink cause individual sheets to stick together, only a predetermined number of sheets are allowed to be stacked. Thus, once the predetermined number of sheets are stacked up, spacers are placed adjacent the corners of the loaded racking board, and another racking board is placed atop the spacers so that freshly printed sheets can be stacked thereupon. The spacers bear the load of the new racking board and subsequent paper stack thereupon, and are commonly called "corner angle supports."

Once a predetermined number of racking boards have been loaded and stacked, a forklift typically moves the multiple loaded racking boards via the pallet. Then, the loaded racking boards are placed outside the printing press so that the sheets can fully dry.

A common prior art racking board measures thirty-two (32) inches wide, forty-five (45) inches long, and three quarter (0.75) inches thick, but their size depends on the size of the printing press. Conventional racking boards are typically made out of flat plywood panels, making them relatively heavy (e.g., 17–27 pounds, depending on the size of the printing press). Also, the boards can be very awkward to manually carry because of their size and weight.

Moreover, the same racking boards are repeatedly loaded, unloaded, stacked, and moved, and during these processes, the boards often collide with other objects or are inadvertently dropped. Thus, the wood often splinters and cracks, especially at the edges and corners of the racking board. The splintered and cracked board can be difficult and hazardous to carry, and over prolonged use render the board useless.

Furthermore, the ink compositions and associated ink solvents used in the printing process typically deteriorate prior art wood racking boards. These chemicals often break down the adhesives holding the plywood laminates together and can deteriorate the wood as well. Over time, as the board deteriorates, the racking board is more likely to swell, splinter, crack, and become unusable.

Improved prior art racking boards include one or two handles. Often, the handle is an aperture forged through the center portion of the board, large enough to allow an average hand to partially fit there through. As such, when moving the board, a worker can fit a hand through the handle and grab the surrounding portion of the board. However, since the handles are in a fixed position on the board, and because there are only one or two handles, there are only a limited number of orientations that the board can be carried in. Thus, the handles do little to ameliorate the awkwardness of carrying the racking board.

Relatedly, when moving the board, a worker often fits one hand through the handle and uses the other hand to grab the edge of the board. However, the hand that grabs the edge of the board can slip along the edge causing the worker to drop and damage the board.

More recently, prior art plywood boards have been provided with molded epoxy rails nailed to the sides to reduce splintering. As such, when the side of the boards strike against another object, the epoxy rails bear the brunt of the collision, and splintering or fracture is less likely to occur. However, the frequent collisions encountered by the racking boards can cause the epoxy rails to crack or fall off, thereby leaving the underlying wood unprotected and allowing for splintering and fracture.

Similar to the racking boards, the corner angle supports are typically made out of wood and include two straight members arranged perpendicularly to each other. Because they are made out of wood, the corner angle supports are relatively heavy and therefore awkward to carry. Also, the same angle supports are used repeatedly and often collide with other objects. Thus, like the racking board, the angle supports often splinter and become hazardous to carry or fracture and become useless prematurely.

Therefore, there is an ongoing need for a lightweight racking board that is generally inert to ink and ink solvents, reduces edge splintering, is easy to carry, and exhibits a longer useful working life. Similarly, there is a need for a corner angle support design that is lightweight and exhibits a longer useful working life.

BRIEF SUMMARY OF THE INVENTION

The aforementioned needs are addressed by the racking board and corner angle supports of the present invention. One aspect of the invention is an injection molded printing press racking board having a flat, planar member with support ribs extending across one side. Moreover, the racking board has at least one stiffening insert and extending across the same side as the ribs. In the preferred embodiment, the typical stiffening insert has an E-shaped cross section, and is embedded within a rib extending partially across the flat, planar member.

Preferably, the racking board has at least one aperture through which a hand can partially fit and a plurality of apertures through which a finger can fit. Moreover, for plastic management and weight reduction purposes, the racking board preferably includes a plurality of apertures. In the preferred embodiment, opposing edges of the racking board are rounded (i.e., bull-nozed). Finally, the racking board preferably includes at least one stacking tab register that includes a flat portion extending outward from one side of the flat; planar member, and a channel extending inward from the opposing side, wherein the channel has a contact surface that is complimentarily shaped to the flat portion.

As such, the injection molded racking board of the present invention is lighter than prior art boards, yet exhibits the required stiffness and strength necessary for printing processes. Therefore, the racking board is advantageously easier to lift. Furthermore, the hand holds and finger holes allow a user to easily move and carry the racking board. Finally, the racking board exhibits a longer useful life because the injection molded polymer material is generally inert to ink compositions and ink solvents and unlikely to splinter or fracture as are similar wooden components of the prior art.

In another aspect, a method of forming a printing press racking board is disclosed. First, a mold is prepared that defines a cavity capable of injection molding a polymer material. Second, at least one stiffening insert is positioned within the mold. Third, the polymer material is introduced into the mold. Finally, the polymer material is allowed to cool to form an injection molded racking board.

The method of the present invention allows a racking board to be formed that is lighter without compromising needed stiffness and strength. Also, the injection molding polymer material used is less likely to splinter or fracture like the prior art materials, thereby giving the racking board a longer useful life.

In another aspect, an injection molded corner angle support is disclosed. The corner angle support has a first portion and a second portion. The second portion extends generally perpendicular from the first portion.

In the preferred embodiment, the corner angle support further includes flanges capable of supporting a racking board, and the flanges are individually attached to the opposing edges of the first and second portions. Moreover, for plastic management and weight saving purposes, the corner angle support preferably includes apertures extending through the first and second portions. Also, the corner angle support preferably includes stiffening ribs attached to the back faces and the four flanges.

As such, the corner angle support of the present invention is lighter than prior art supports, and yet exhibits the required stiffness and strength necessary for printing processes. Moreover, the corner angle supports have a longer user life because the injection molded material is generally inert to ink compositions and ink solvents and is unlikely to splinter or fracture as are similar wooden supports of the prior art.

BRIEF DESCRIPTION OF THE DRAWINGS

These as well as other features of the present invention will become more apparent upon reference to the drawings wherein:

FIG. 3 is a bottom, detail view of the racking board of FIG. 1;

FIG. 4 is a cross sectional view of the racking board of FIG. 3 taken along the line 4—4;

FIG. 5 is a detail view of a cross section of the racking board taken from FIG. 4;

FIG. 10 is an isometric view of one embodiment of a corner angle support of the present invention;

FIG. 11 is an isometric view of the corner angle support of FIG. 10;

FIG. 12 is a side view of multiple stacked and loaded racking boards with corner angle supports positioned there between.

DETAILED DESCRIPTION OF THE INVENTION

Figure 1:
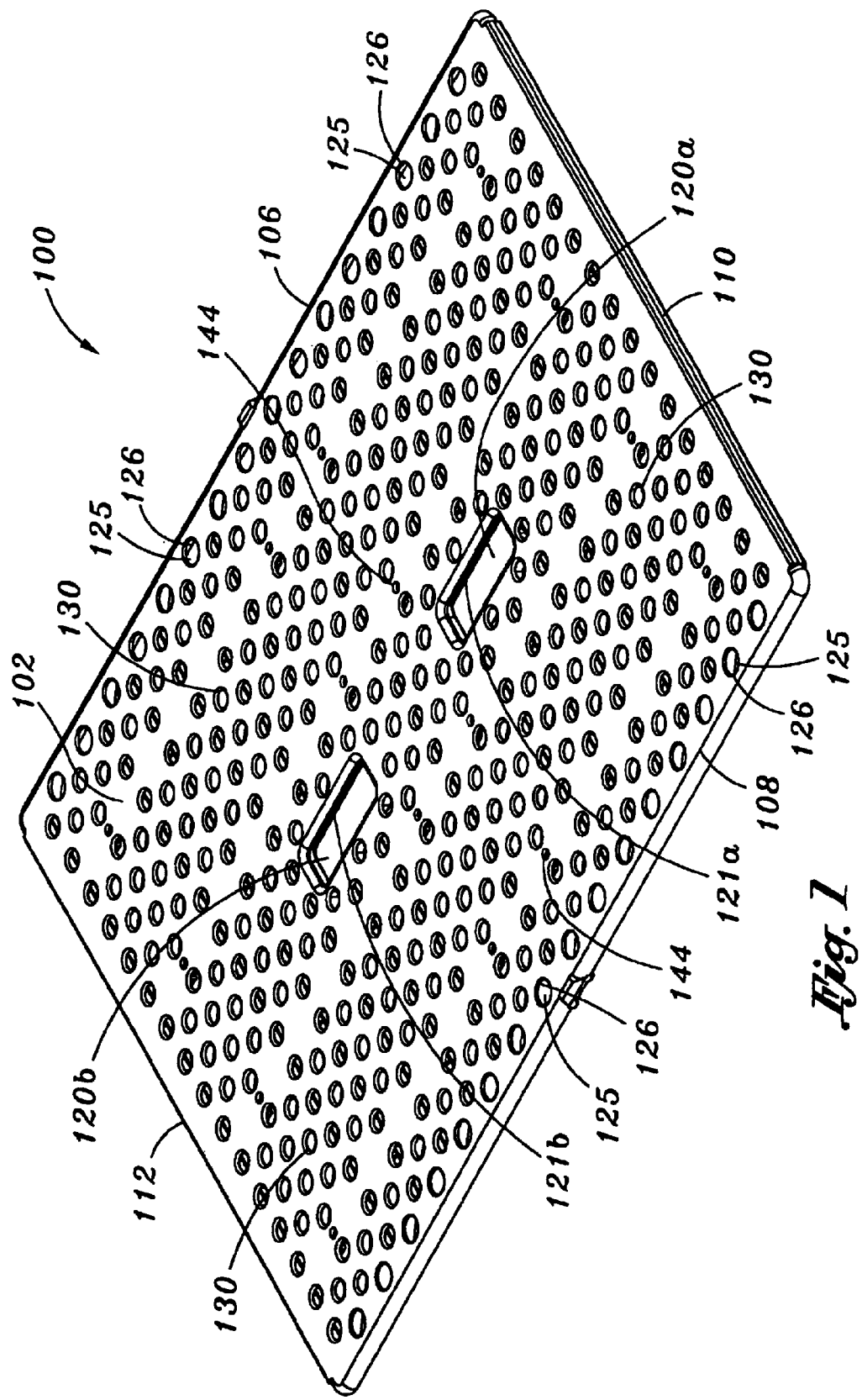
FIG. 1 is an isometric view of one embodiment of a printing press racking board of the present invention.
Figure 2:
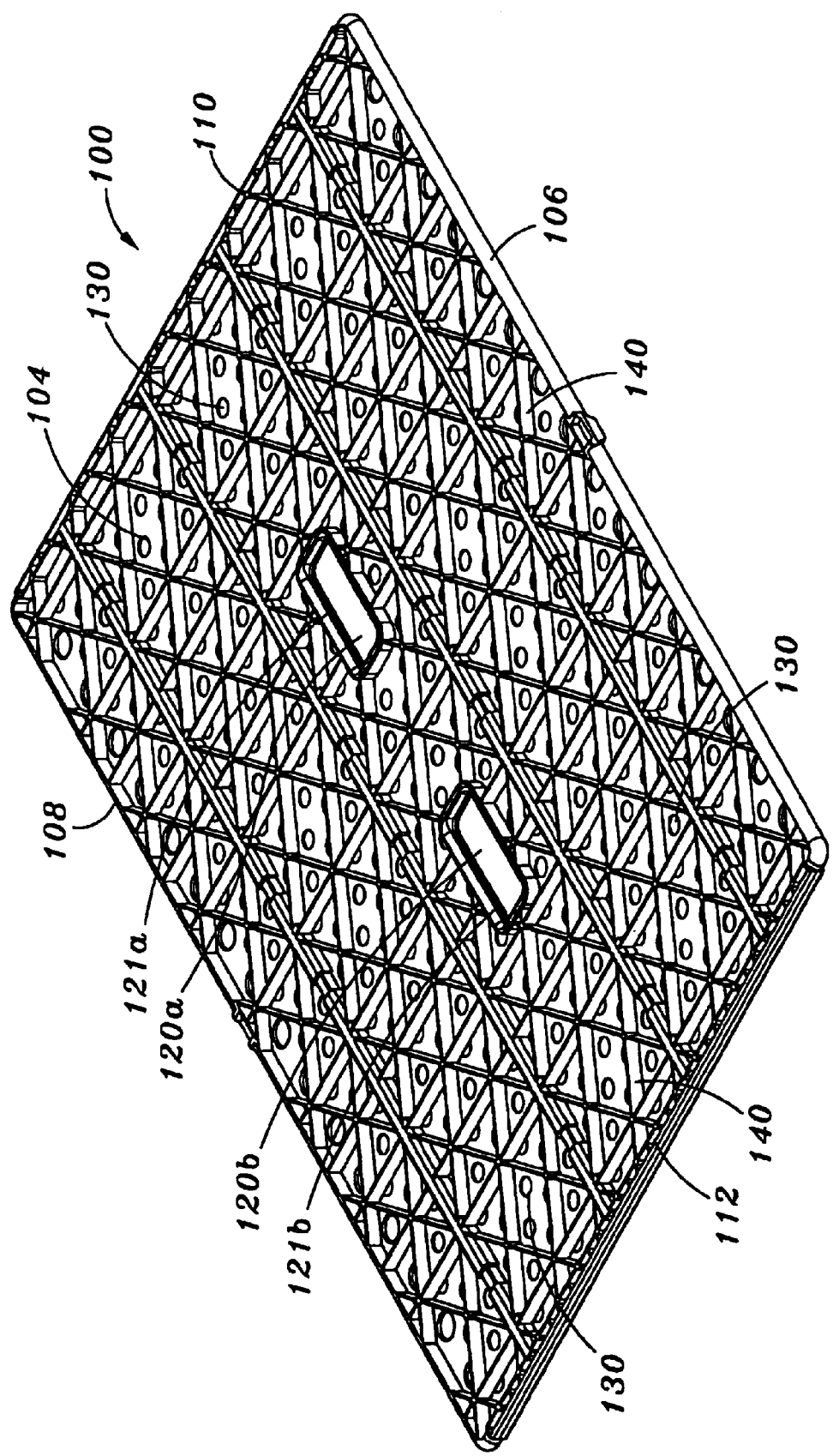
FIG. 2 is an isometric view of the printing press racking board of FIG. 1.

Referring now to the drawings wherein the showings are for purposes of illustrating preferred embodiments of the present invention only, and not for purposes of limiting the same, FIGS. 1 and 2 depict the printing press racking board 100 of the present invention. The racking board 100 is generally flat and rectangular so as to define a top surface 102, a bottom surface 104, a first side 106, a second side 108, a third side 110, and a fourth side 112. The racking board 100 measures thirty-two inches wide and forty-five inches long in one embodiment, but of course may vary in size according to the parameters of the printing process. In the preferred embodiment, the racking board 100 is fabricated from an injection molded polymer such as a polypropylene polyphenylene oxide blend (e.g. Noryl PPX™ manufactured by GE Plastics) or other suitable resin.

As shown, the racking board 100 includes multiple hand holds 120a, 120b. In the embodiment shown, each hand hold 120a, 120b is a rectangular opening extending between the top surface 102 and the bottom surface 104, and both hand holds 120a, 120b are positioned near the center of the racking board 100. Each hand hold 120a, 120b defines an internal surface 121a, 121b. Moreover, each hand hold 120a, 120b is preferably large enough such that a hand may partially fit there through. As such, the hand holds 120a, 120b provide a means of carrying the racking board 100, especially when the racking board 100 is carried vertically, because a user can fit a hand through one of the hand holds 120a, 120b and support the racking board 100 by the internal surface 121a, 121b of the hand hold 120a, 120b. In the embodiment shown, the internal surfaces 121a, 121b are rounded between the top surface 102 and the bottom surface 104 so that the internal surfaces 121a, 121b are more comfortable to grab when carrying the racking board 100. Thus, the racking board 100 is easier to carry due to the hand holds 120a, 120b.

As is also shown in FIGS. 1 and 2, the racking board 100 also includes a plurality of holes 130. The typical hole 130 is a small, round hole extending between the top surface 102 and bottom surface 104. In the embodiment shown, the holes 130 are arranged in evenly spaced rows and columns, but other embodiments have different numbers of holes 130 arranged in alternative ways. The holes 130 allow for proper polymer management and also reduce the weight of the racking board 100 without significantly compromising the structural integrity of the same.

Furthermore, the racking board 100 includes finger holes 125. The finger holes 125 are round holes extending between the top surface 102 and bottom surface 104 so as to define individual internal surfaces 126. The diameter of each finger hole 125 is large enough to allow a finger to extend therethrough. The finger holes 125 are arranged in a row along the first and second sides 106, 108 as shown. As such, when carrying the racking board 100, the user can position a finger through one or more of the finger holes 125 and support the racking board 100 by the respective internal surface 126. In one embodiment, the individual internal surfaces 126 are rounded between the top surface 102 and the bottom surface 104 so that the internal surface 126 is more comfortable against the user's finger when carrying. It is noted that without finger holes 125, the racking board 100 would likely be carried by grabbing one of the sides 106, 108, 110, 112, and this method is more likely to allow the racking board 100 to slip out of the user's hand. In contrast, the finger holes 125 each provide an internal surface 126 that encircles the finger for less slippage. Thus, the finger holes 125 advantageously make transporting the racking board 100 more convenient. Also, the sheer number of finger holes 125 advantageously allows the user to securely carry the racking board 100 in a number of orientations, thereby allowing a user to more easily carry the racking board 100.

As is shown in FIG. 2 and in detail in FIG. 3, the racking board 100 preferably includes a plurality of support ribs 140. Each rib 140 has a thin, rectangular cross section and is preferably integrally attached on the bottom surface 104 of the racking board 100. In the embodiment shown, some ribs 140 extend between the first side 106 and the second side 108, other ribs 140 extend between the third side 110 and the fourth side 112, and still other ribs 140 extend diagonally between the sides 106, 108, 110, 112. As such, the ribs 140 collectively allow the racking board 100 to resist bending.

Furthermore, the racking board 100 comprises stiffening inserts 142. Each stiffening insert 142 comprises an elongated, metallic member such as an aluminum extrusion that extends between the third and fourth sides 110, 112 in the embodiment shown. The stiffening inserts 142, in conjunction with the ribs 140, increase the stiffness of the racking board 100 so that the same can more readily support a heavy load of freshly printed sheets.

As mentioned above, the preferred embodiment of the racking board 100 is injection molded, and as shown in the embodiment of FIGS. 4 and 5, the stiffening inserts 142 are partially embedded within ribs 140. To embed the stiffening inserts 145, the stiffening inserts 142 are placed within the mold before cooling to allow the insert 142 to be embedded as shown. The embedded arrangement allows bending loads to more readily transfer between the stiffening inserts 142 and the associated ribs 140 for greater stiffness.

In the preferred embodiment, the stiffening inserts 142 have a generally E-shaped cross sectional configuration. As such, the stiffening inserts 142 each include a base portion 143 and three branches 144. The base portion 143 is oriented so as to be generally parallel to the top surface 102, and the branches 144 extend perpendicularly downward therefrom. As noted above, the preferred embodiment of the racking board 100 is injection molded. As is understood in the art, proper cooling is most often achieved when the finished part is to have generally uniform wall thicknesses. As is shown particularly in FIG. 5, the thickness of material between the branches 144 is approximately equal to the thickness of material surrounding the stiffening insert 142. Thus, if the racking board 100 is injection molded, the injected material around the stiffening insert 142 is more likely to cool at the same rate because the material thicknesses are approximately equal. Due to the equal cooling rate, the racking board 100 is more likely to exhibit uniform stiffness and strength.

Preferably, the stiffening inserts 142 extend just short of the third and fourth sides 110, 112. The difference in length allows for different thermal expansion rates of the stiffening inserts 142 and the other materials of the racking board 100. In other words, the stiffening inserts 142 can expand and contract differently from the injection molded material of the racking board 100 without damaging either because of the shorter length of the stiffening inserts 142.

Although the embodiment shown depicts four stiffening inserts 142 extending between the third and fourth sides 110, 112, it is understood that a different number of stiffening inserts 142 arranged differently could be used without departing from the spirit of the invention. The number of stiffening inserts 142 and their orientation depends on the average load on the racking board 100 and the primary bending axis of the racking board 100.

Figure 6:
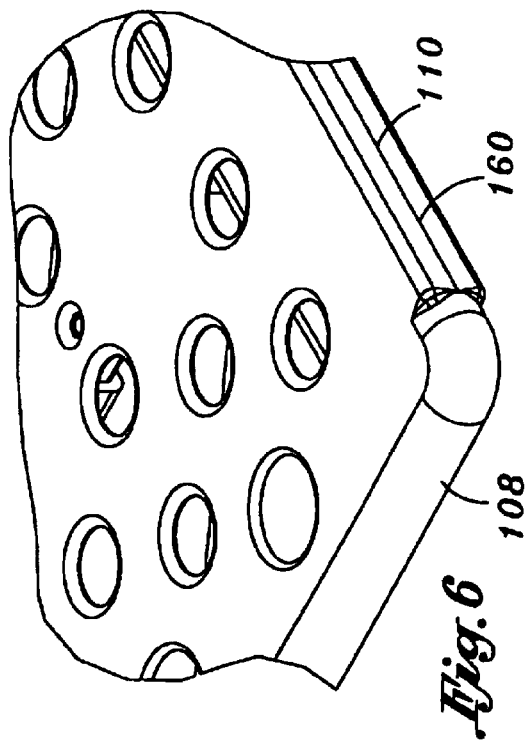
FIG. 6 is an isometric view of a portion of the racking board of FIG. 1.

Turning now to FIG. 6, an intersection of the second and third sides 108, 110 is illustrated. As shown, the third side 110 is flat. In other words, the third side 110 is largely perpendicular to both the top and bottom surfaces 102, 104. In the preferred embodiment, the fourth side 112 has a flat shape like the third side 110. As such, when the racking board 100 is loaded into a printing press (not shown), the flat shape of the third and fourth sides 110, 112 allows the racking board 100 to engage switches (not shown) on the printing press (not shown) for proper operation.

As is also depicted in FIG. 6, the second side 108 has a rounded, bull-nose shape. In other words, the second side 108 is curved outward between the top and bottom surfaces 102, 104. In the preferred embodiment, the first side 106 has a rounded, bull-nose shape like the second side 108. Preferably, the racking board 100 is transported by forklift (not shown) with either the first or second side 106, 108 positioned adjacent to the forks of the forklift. Thus, if the forks happen to contact the rounded first or second side 106, 108 acts like a cam and causes the racking board 100 to pivot upward. Advantageously, this embodiment of the first and second side 106, 108 is less likely to fracture due to such contact.

Figure 7:
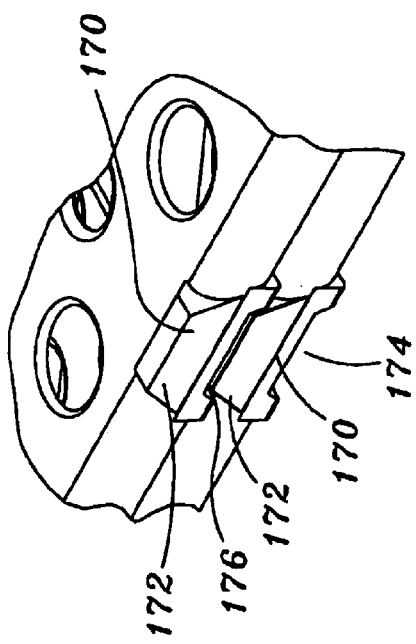
FIG. 7 is an isometric view of a portion of multiple racking boards like those of FIG. 1 stacked atop each other.
Figure 9:
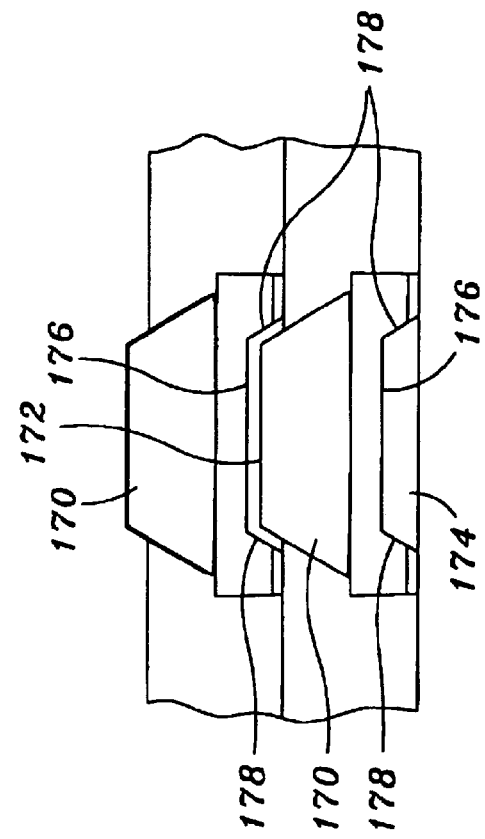
FIG. 9 is a side view of a portion of multiple racking boards like those of FIG. 1 stacked atop each other.
Figure 8:
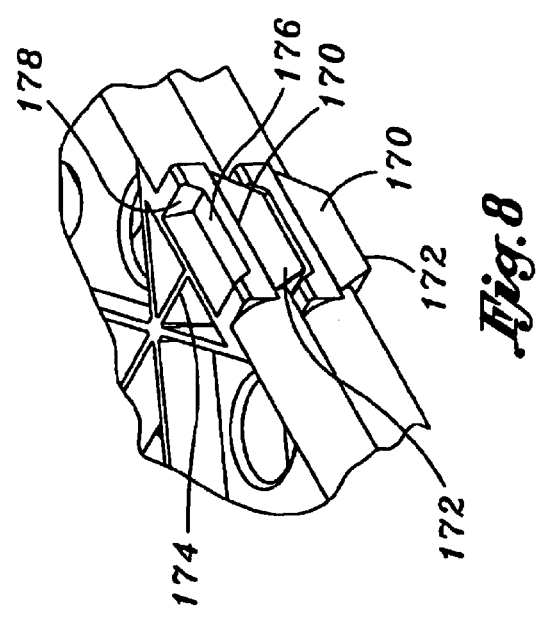
FIG. 8 is an isometric view of a portion of multiple racking boards like those of FIG. 1 stacked atop each other.

Turning now to FIGS. 7 through 9, multiple racking boards 100 are illustrated, stacked atop each other. As shown, each racking board 100 comprises a stacking tab register 170. Each stacking tab register 170 includes a flat portion 172 and a channel 174. The flat portion 172 is a small, rectangular, flat surface that extends outward from the top surface 102 of the racking board 100. The channel 174 is a shallow cavity extending inward from the bottom surface 104 toward the top surface 102. The channel 174 has a contact surface 176 that is largely parallel to the top surface 102, is complimentarily shaped to the flat portion 172, and is positioned between the top and bottom surfaces 102, 104. The channel 174 also has internal walls 178 that extend downward from the contact surface 176 to the bottom surface 104. In the preferred embodiment of the stacking tab register 170, the channel 174 and flat portion 172 are substantially aligned.

As shown in FIGS. 7 through 9, the stacking tab register 170 is attached to the second side 108 of the racking board 100. In the preferred embodiment, a stacking tab register 170 is also attached to the first side 106.

Preferably, the stacking tab registers 170 are attached at approximately the same location on each racking board 100. As such, when the racking boards 100 are stacked with all of the top surfaces 102 facing upward and all the bottom surfaces 104 facing downward, the flat portion 172 of one racking board 100 can be positioned within the channel 174 of the racking board 100 immediately above. (Obviously, if the stack of racking boards 100 are inverted, then the stacking tab registers 170 would interact in the same manner.) The stacking tab registers 170 are preferably designed such that the internal walls 178 of one stacking tab register 170 interfere with horizontal movement of the flat portion 172 of another stacking tab register 170. Thus, the stacking tab registers 170 tend to retain racking boards 100 together in a stack. Advantageously, it is less likely that the racking boards 100 would inadvertently slide off from the stack and become damaged.

Turning now to FIGS. 10 and 11, a corner angle support 180 is depicted. In the embodiment shown, the corner angle support 180 includes a long portion 182, which is an elongated, flat member, and a short portion 184, which is a shorter, flat member extending perpendicularly from an end 199 of the long portion 182. The width of both the long portion 182 and the short portion 184 is slightly larger than the predetermined height of a stack of printed material that piles up on the racking board 100. The long portion 182 includes a front face 152 and a back face 153, and the short portion 184 similarly includes a front face 156 and a back face 157.

A plurality of apertures 186 are arranged about the corner angle support 180. The apertures 186 are rectangular in shape and extend through the long portion 182 between the front and back faces 152, 153, and through the short portion 184 between the front and back faces 156, 157. The apertures 186 allow for proper plastic management and also reduce the weight of the corner angle support 180 to make the same easier to carry.

Furthermore, the corner angle support 180 has a pair of first stiffening members 160a, 160b and a pair of second stiffening members 161a, 161b. Each first stiffening member 160a, 160b is a thin flange shaped like an "L" and extending perpendicularly from opposing sides of the corner angle support 180 away from the back faces 153, 157. Similarly, each second stiffening member 161a, 161b is a straight, thin flange extending perpendicularly from opposing sides of the corner angle support 180 away from the back faces 153, 157. Due to their orientation, the first and second stiffening members 160a, 160b, 161a, 161b resist bending of the corner angle support 180. Also, the orientation of the first stiffening members 160a, 160b provides flat surfaces upon which racking boards 100 may rest as will be described in greater detail below.

As is also shown in FIG. 11, the corner angle support 180 comprises a plurality of ribs 190. In one embodiment, the typical rib 190 has a triangular shape and extends between the back faces 153, 157 and the first stiffening members 160a, 160b. In the embodiment shown, a rib 190 is aligned above and below each aperture 186. As such, the ribs 190 reinforce the corner angle support 180 and maintain the first stiffeners 160a, 160b perpendicular to the back faces 153, 157 when the corner angle support 180 is loaded.

In the preferred embodiment, the corner angle support 180 is fabricated via injection molding. The advantages of such a process are described in greater detail below.

Figure 12:
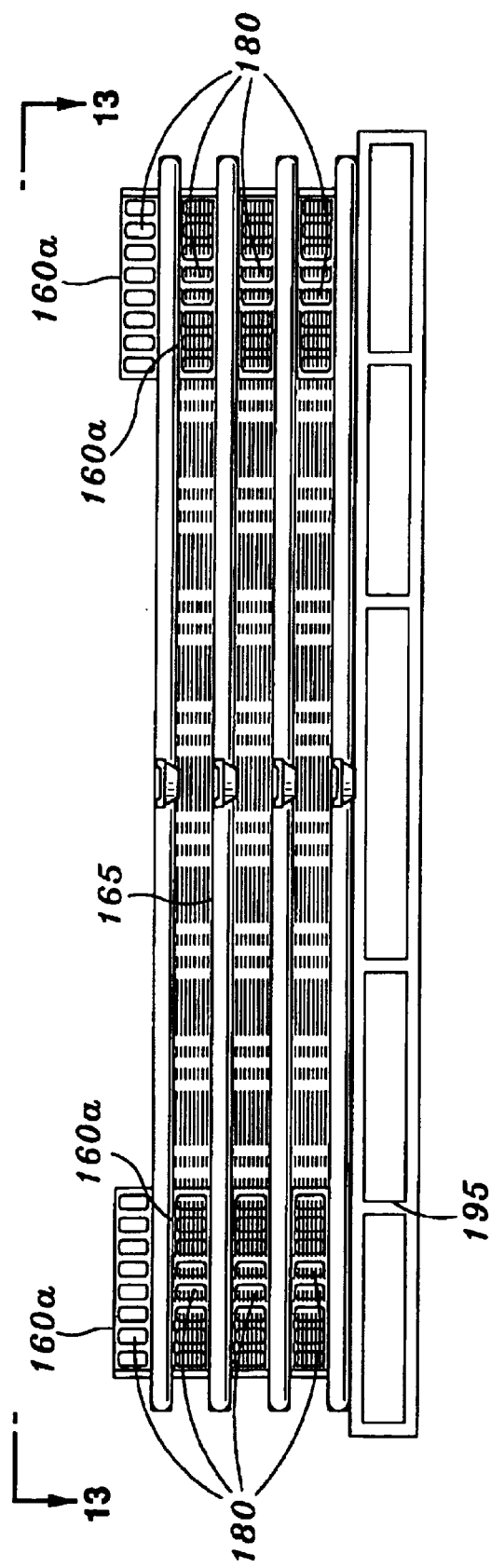
Figure 13:
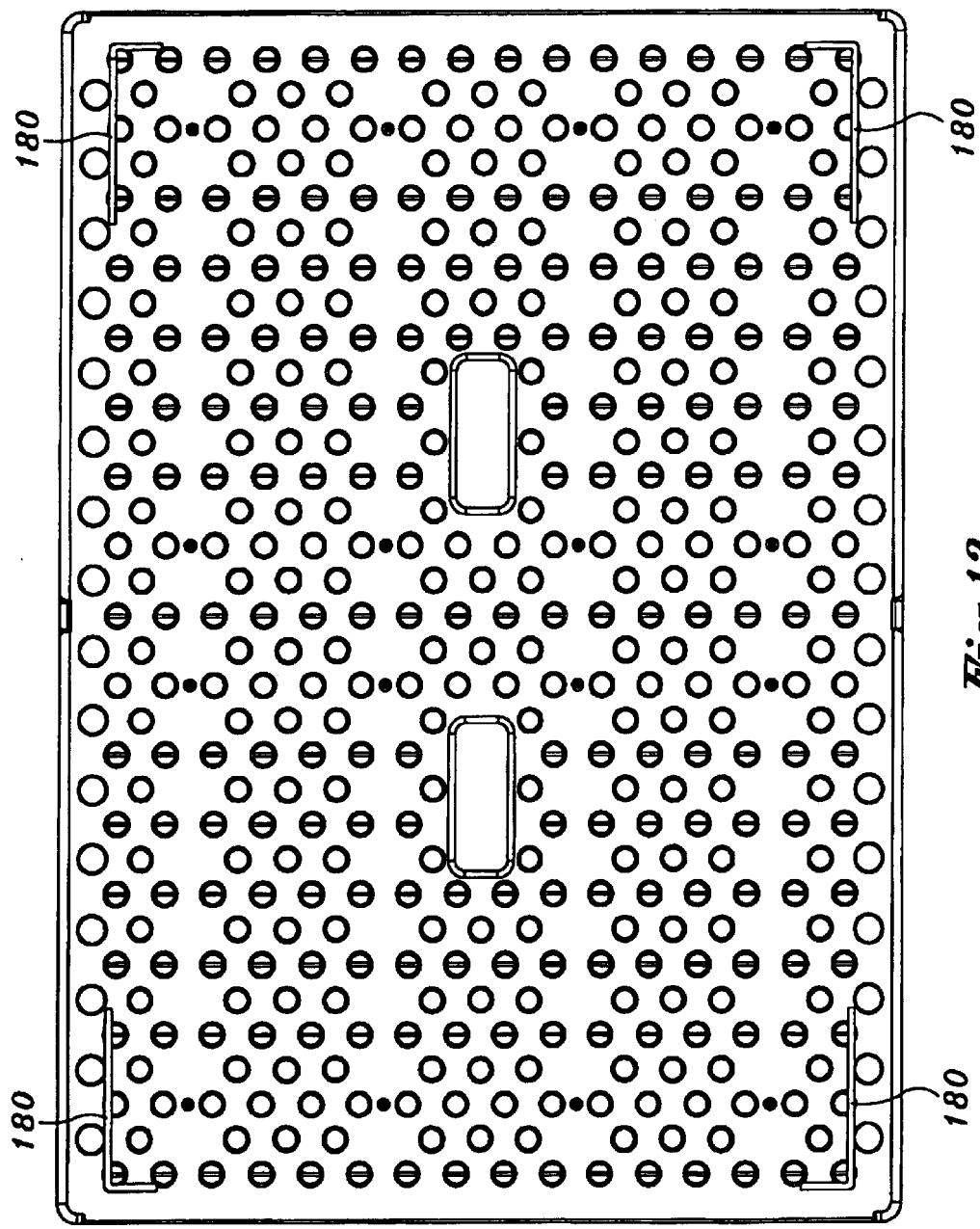
FIG. 13 is a top view of the racking boards and corner angle supports of FIG. 12 taken along the line 13—13.

Turning now to FIGS. 12 and 13, multiple racking boards 100 are shown individually loaded with printed sheets 165. As is shown in FIG. 13, as the printed sheets 165 stack up to a predetermined height, two corner angle supports 180 are positioned at opposing corners of the racking board 100. Then, an empty racking board 100 is placed on the first stiffening members 160a (as shown in FIG. 12) and more printed sheets 165 can stack on the empty racking board 100. Also, as shown in FIG. 12, the racking boards 100 are positioned atop a pallet 195 so that a forklift may transport the stack.

As stated above, the racking board 100 and the corner angle supports 180 are made through injection molding processes. Manufactured as such, the racking board 100 and corner angle supports 180 are made out a lightweight, polymer material. Also, injection molding allows the intricate features like the ribs 140, 190, stiffening inserts 142, and the first and second stiffening members 160a, 160b, 161a, 161b to be formed easily and expensively, and these features provide the necessary stiffness and strength. Thus, the injection molded racking board 100 and corner angle supports 180 are lighter than prior art wooden components, yet they still retain the required stiffness and strength. For example, in one embodiment, the racking board 100 weighs between 13 and 15 pounds, which is approximately 50% lighter than wooden boards of the prior art.

Furthermore, the polymeric material forming the racking board 100 and corner angle supports 180 preferably exhibits a high impact strength and is inert to printing ink. For instance, the racking board 100 is made out of a polypropylene polyphenylene oxide blend (e.g., Noryl PPX™ manufactured by GE Plastics) in one embodiment. Also, in one embodiment, the strengths of the racking board 100 and corner angle supports 180 are increased by using known injection molding processes that utilize a foaming agent or a gas assist. As such, the racking board 100 and corner angle support 180 are less prone to splintering and cracking than the prior art and thus exhibit a longer useful life. In one embodiment, the injection molded racking board 100 has a useful life that is approximately five times longer than the wooden boards of the prior art.

Thus, in summary, the racking board 100 and corner angle support 180 described above is more lightweight than the prior art wooden components. Therefore, the racking board 100 and the corner angle support 180 are advantageously easier to lift. Furthermore, the racking board 100 includes hand holds 120a, 120b, and finger holes 125. Advantageously, users can more easily transport the racking board 100. Finally, the racking board 100 and corner angle support 180 exhibit a longer useful life because they are less likely to splinter and crack as compared with similar prior art wooden components.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. An injection-molded printing press racking board comprising:
   a flat member comprising a top surface and a bottom surface, the flat member further comprising first, second, third, and fourth sides extending between the top and bottom surfaces, the first and second sides disposed between the third and fourth sides;
   a plurality of ribs attached to the bottom surface, selective ones of the ribs extending diagonally from the first and third sides in substantially parallel arrangement, other selective ones of the ribs extending diagonally from the second and third sides in substantially parallel arrangement, additional selective ones of the ribs extending orthogonally from the first side to the second side for enhancing rigidity of the flat member; and
   at least one stiffening insert attached to and extending across the bottom surface orthogonal to the additional selective ones of the ribs.

2. The racking board of claim 1, wherein the at least one stiffening insert has a generally E-shaped cross sectional configuration.

3. The racking board of claim 1, wherein further additional selective ones of the ribs extends across the bottom surface orthogonally from the third side to the fourth side.

4. The racking board of claim 1, further comprising at least one aperture extending between the top and bottom surfaces through which a hand can partially fit.

5. The racking board of claim 1, further comprising a plurality of apertures extending between the top and bottom surfaces through which a finger can fit.

6. The racking board of claim 1, further comprising a plurality of weight reducing holes extending between the top and bottom surfaces.

7. The racking board of claim 1, further comprising at least one side that is rounded outward from the top surface to the bottom surface.

8. The racking board of claim 1, further comprising at least one stacking tab register that includes a flat portion extending outward from the top surface and a channel extending inward from the bottom surface, wherein the channel further includes a contact surface that is largely parallel to the flat portion.

9. The racking board of claim 1, wherein the at least one stiffening insert is embedded within at least one rib.

10. The racking board of claim 1, wherein the flat member and ribs are made out of a polypropylene polyphenylene oxide blend.

11. A method of forming a printing press racking board, the board including a flat member comprising a top surface and a bottom surface, the flat member further comprising first, second, third, and fourth sides extending between the top and bottom surfaces, the first and second sides disposed between the third and fourth sides, a plurality of ribs attached to the bottom surface, selective ones of the ribs extending diagonally from the first and third sides in substantially parallel arrangement, other selective ones of the ribs extending diagonally from the second and third sides in substantially parallel arrangement, additional selective ones of the ribs extending orthogonally from the first side to the second side for enhancing rigidity of the flat member, at least one stiffening insert attached to and extending across the bottom surface orthogonal to the additional selective ones of the ribs, the method comprising:
   preparing a mold that defines a cavity capable of containing a molten polymer and capable of forming the printing press racking board;
   positioning at least one stiffening insert within the mold;
   introducing the molten polymer into the mold;
   allowing the molten polymer to cool, forming an injection molded printing press racking board.

12. The racking board of claim 11, wherein the at least one stiffening insert has a generally E-shaped cross sectional configuration.

13. The racking board of claim 11, wherein the at least one stiffening insert partially extends across the bottom surface orthogonally from the third side to the fourth side.

14. The racking board of claim 11, wherein the molten polymer is a polypropylene polyphenylene oxide blend.

15. An injection molded corner angle support, the corner angle support useful for providing space between stacked printing press racking boards and comprising:
   a first portion defining a first end, a second end, a top side, a bottom side, a front face, and a back face;
   a second portion attached to the first end and extending generally perpendicular from the first portion, the second portion defining a top side, a bottom side, a front face, and a back face;
   a first flange attached to the top side of the first portion and extending perpendicularly away from the back face of the first portion;
   a second flange attached to the bottom side of the first portion and extending perpendicularly away from the back face of the first portion;
   a third flange attached to the top side of the second portion and extending perpendicularly away from the back face of the second portion; and
   a fourth flange attached to the bottom side of the second portion and extending perpendicularly away from the back face of the second portion.

16. The corner angle support of claim 15, further comprising weight reducing apertures extending through the first portion from the front face to the back face of the first portion.

17. The corner angle support of claim 15, further comprising weight reducing apertures extending through the second portion from the front face to the back face of the second portion.

18. The corner angle support of claim 15, further comprising:
   a first set of ribs individually attached to both the back face of the first portion and the first flange;
   a second set of ribs individually attached to both the back face of the first portion and the second flange;
   a third set of ribs individually attached to both the back face of the second portion and the third flange; and
   a fourth set of ribs individually attached to both the back face of the second portion and the fourth flange.

19. The corner angle support of claim 15, wherein the corner angle support is made from a polypropylene polyphenylene oxide blend.

20. An injection-molded printing press racking board comprising:
   a flat member comprising a top surface and a bottom surface, the flat member including a plurality of weight reducing holes extending between the top and bottom surfaces, the flat member further including a plurality of apertures extending between the top and bottom surfaces for placing a finger therethrough and at least one aperture extending between the top and bottom surfaces for placing a hand therethrough, the flat member further comprising first, second, third, and fourth sides extending between the top and bottom surfaces, the first and second sides disposed between the third and fourth sides, at least one of the sides being rounded outward from the top surface to the bottom surface, the flat member being made of a polypropylene polyphenylene oxide blend;
   at least one stacking tab register including a flat portion and a channel, the flat portion extending outward from the top surface of the flat member, the channel extending inward from the bottom surface of the flat member, wherein the channel further includes a contact surface that is largely parallel to the flat portion;
   a plurality of ribs attached to the bottom surface, selective ones of the ribs extending diagonally from the first and third sides in parallel arrangement, other selective ones of the ribs extending diagonally from the second and third sides in parallel arrangement, additional selective ones of the ribs extending orthogonally from the first side to the second side for enhancing rigidity of the flat member;

at least one stiffening insert attached to and extending across the bottom surface orthogonal to the additional selective ones of the ribs, the stiffening insert including a generally E-shaped cross section for enhancing rigidity of the flat member; and an injection molded corner angle support, the corner angle support useful for providing space between stacked printing press racking boards, the corner angle support comprising:
- a first portion defining a first end, a second end, a top side, a bottom side, a front face, and a back face;
- a second portion attached to the first end and extending generally perpendicular from the first portion, the second portion defining a top side, a bottom side, a front face, and a back face;
- a first flange attached to the top side of the first portion and extending perpendicularly away from the back face of the first portion;
- a second flange attached to the bottom side of the first portion and extending perpendicularly away from the back face of the first portion;
- a third flange attached to the top side of the second portion and extending perpendicularly away from the back face of the second portion; and
- a fourth flange attached to the bottom side of the second portion and extending perpendicularly away from the back face of the second portion.

* * * * *